United States Patent [19]

Smith, Jr.

[11] 4,131,588
[45] Dec. 26, 1978

[54] LOW VAPOR TRANSMISSION RATE SILICONE COMPOSITION

[75] Inventor: Alfred H. Smith, Jr., Jonesville, N.Y.

[73] Assignee: General Electric Company, Waterford, N.Y.

[21] Appl. No.: 750,061

[22] Filed: Dec. 13, 1976

[51] Int. Cl.$^2$ ............................................. C08L 83/04
[52] U.S. Cl. ................................................. 260/37 SB
[58] Field of Search .............. 260/37 SB; 106/DIG. 3

[56] References Cited

U.S. PATENT DOCUMENTS

| | | | |
|---|---|---|---|
| 2,843,555 | 7/1958 | Berridge | 260/37 SB |
| 2,984,590 | 5/1961 | Anderson | 260/37 SB |
| 3,126,357 | 3/1964 | Liebig | 260/37 SB |
| 3,888,815 | 6/1975 | Bessmer et al. | 260/37 SB |
| 3,969,310 | 7/1976 | Itoh et al. | 260/37 SB |

*Primary Examiner*—Lewis T. Jacobs
*Attorney, Agent, or Firm*—John L. Young; E. Philip Koltos; Frank L. Neuhauser

[57] ABSTRACT

A low moisture vapor transmission rate room temperature vulcanizable silicone composition comprising a silanol end-stopped diorganopolysiloxane with optionally a reinforcing or extending filler, an alkyl silicate crosslinking agent or in the alternative a co-polymer composed of monofunctional and tetrafunctional units and a catalyst which is the metal salt of carboxylic acid such as dibutyl tin dilaurate where the improvement comprises having in such a composition from 75 to 150 parts by weight of a vapor barrier filler which is mica with optionally up to 30% by weight of said vapor barrier filler being talc, wherein the above concentration of filler is based upon 100 parts of the silanol end-stopped diorganopolysiloxane polymer. Also in the present invention there is envisioned as SiH Olefin platinum catalyzed composition which has the foregoing mica as a vapor barrier filler.

12 Claims, No Drawings

LOW VAPOR TRANSMISSION RATE SILICONE COMPOSITION

BACKGROUND OF THE INVENTION

The present invention relates to a room temperature vulcanizable silicone rubber composition and more particularly the present invention relates to a room temperature vulcanizable silicone rubber composition which has a low vapor transmission rate as the result of having incorporated into the composition a mica filler.

Room temperature vulcanizable silicone rubber compositions are well known. Particularly, the two component or two part room temperature vulcanizable silicone rubber compositions. Such compositions generally comprise a silanol end-stopped diorganopolysiloxane as the base polymer, a reinforcing filler selected from precipitated silica and fumed silica and optionally an extending filler such as zinc oxide, iron oxide, diatomaceous earth, quartz, ground quartz, etc. Normally the silanol end-stopped diorganopolysiloxane is mixed with the filler and is packaged separately. In the other package or component there is provided a cross-linking agent which can be an alkyl silicate or a partial hydrolysis products of such silicates. Optionally as an alternative cross-linking agent there can be present in the composition a cross-linking agent, a silicone resin composed of monofunctional units and tetrafunctional units. There must be also present in the composition a metal salt of carboxylic acid as a catalyst to speed up the rate of reaction of the composition to form a silicone elastomer. Usually the cross-linking agent and the catalyst are packaged in a separate package or component. Either package can have additional ingredients as long as the cross-linking agent and the catalyst are kept separate from the silanol end-stopped diorganopolysiloxane polymer. When it is desired to cure the composition the two components are mixed together to form a homogeneous mixture which then cures in a period of time varying anywhere from a half hour to 24 hours to obtain the desired silicone elastomer. Another two-part room temperature vulcanizable silicone rubber composition that is also well known in the SiH Olefin platinum catalyzed compositions in which a vinyl containing polysiloxane polymer is packaged separately with a filler and in which the second part of the composition comprises a hydride silane or siloxane packaged with platinum. The platinum in this case can be present in either the hydride cross-linking agent or with the vinyl containing polymer, as long as there is not, in any one package or component a combination of the platinum with the hydride cross-linking agent with some of the vinyl containing polymer. Accordingly in such SiH Olefin platinum catalyzed compositions the two components are mixed together and either at room temperature or at elevated temperatures cured to form a silicone elastomer. Such two component room temperature vulcanizable silicone rubber compositions are well known as encapsulant sealants. Normally such two component room temperature vulcanizable silicone rubber compositions accomplish their sealant function especially for the sealing of glass panes and partitions to masonry and other types of base structure material with desirable efficiency. However, they have one disadvantage in that as previously formulated they have a high moisture vapor transmission rate. Such prior art two-component room temperature vulcanizable silicone rubber compositions have vapor transmission rate of somewhere in the are of 40 to 50 grams per square meter in a 70 mils. thick section of silicone elastomer. As stated previously for most application this did not create a problem. However, the high vapor transmission rate was exceedingly undesirable in the case the silicone material was used to enclose a sealed area in which vapor accumulation was a problem. The need for such low vapor transmission rate for silicone sealants was even more noticeable in the case where it was desired to fabricate insulated window panes so that the glass would be insulated by the air pocket between the panes. Thermal panes are the best glass insulated glass partitions known in the industry. To produce thermo panes two glass sheets are hermitically sealed to each other with a layer of air in between the panes which is completely dry such that moisture cannot permeate and enter the air barrier between the glass panes. The manufacture of such thermal panes is expensive which makes them unduly costly for insulation in high rise buildings. Accordingly, in a recent innovation in the industry a facsimile of thermo panes is produced by taking two clear glass panes and sealing the edges with a sealant such as a polysulfide sealant, which polysulfide sealant is again applied to the sealed glass pane so as to seal the insulated window pane to the frame of the building. Such polysulfide sealants have a moisture vapor transmission rate of about 15 grams per meter square of 70 mils thick sealant. Although suitable to some extent the polysulfide vapor transmission rate as noted above is still a little too high. Accordingly, in some cases when such fabricated insulated glass panes are tested by cycling them from a low temperature of −60° F to 150° F there is invariably too much moisture that has migrated through the sealant into the air space between the glass panes and as a result the glass panes will fog up with water vapor. As an improvement there has been inserted between the two panes of the insulated glass construction a butyl rubber tape having a dessicant therein over which there is applied the polysulfide sealant so as to maintain a low vapor transmission rate into the air space between the glass panes. The use of silica gel or micro seives or another dessicant with the butyl rubber tape and the polysulfide sealant results in a combination that had a low moisture transmission rate. However, such construction of insulated glass panes is very expensive. Furthermore, the construction utilizing the butyl tape with the dessicant therein is still undesirable in that polysulfides do not have as good weatherability as is experienced with silicones. Further, as can be envisioned there could be utilized a butyl rubber tape between the two glass panes with prior art silicone rubber compositions. However, in some cases too much moisture is transmitted into the air pocket between the glass panes. In addition, the silicone butyl rubber tape combination cannot be utilized for sealing the insulated glass panes to the frame of high rise buildings. Accordingly, it would be highly desirable to have a low vapor transmission rate silicone sealant.

It is an object of the present invention to provide for a two component low moisture vapor transmission rate room temperature vulcanizable silicone rubber composition in which the cross-linking agent in the composition is either a silanol terminated resin composed of monofunctional or tetrafunctional units or a silicate.

It is yet an additional object of the present invention to provide for two component room temperature or heat vulcanizable silicone rubber composition with a low vapor transmission rate where the composition cures to an elastomer by the utilization of an SiH olefin platinum catalyzed reaction. It is yet an additional object of the present invention to provide for a process for forming either a heat vulcanizable or room temperature vulcanizable two component silicone rubber compositions with a low vapor transmission rate wherein the silicone elastomer is formed in an SiH olefin platinum catalyzed reaction.

These and other objects of the present invention are accomplished by the means of objects set forth herein below.

SUMMARY OF THE INVENTION

In accordance with the foregoing objects there is provided by the present invention a low moisture vapor transmission rate room temperature vulcanizable silicone composition comprising (a) 100 parts by weight of a polymer polymer having a viscosity varying from 100 to 500,000 centipoise at 25° C wherein the said organic groups are selected from the class consisting of monovalent hydrocarbon radicals and halogenated monovalent hydrocarbon radicals (b) from 75 to 150 parts by weight of a vapor barrier filler which is mica with optionally up to 30% by weight of the vapor barrier filler of talc (c) 0 to 30 parts by weight of reinforcing or extending filler (d) from 1 to 16 parts by weight of a cross-linking agent selected from a class consisting of $R_a Si (OR^1)_{4-a}$ and partial hydrolysis product thereof where R and R' are selected from a class consisting of monovalent hydrocarbon radicals and halogenated monovalent hydrocarbon radicals a is 0 or 1 or a resinous copolymer of $R^2_3 SiO_{0.5}$ units and $SiO_2$ units in a weight ratio of 0.5:1 to 1:1 where $R^2$ is selected from monovalent hydrocarbon radicals and halogenated monovalent hydrocarbon radicals and (e) from 0.01 to 5 parts by weight of a metal salt of carboxylic acid as a catalyst where the metal varies from lead to manganese in the Periodic Table. Preferably the vapor barrier filler is all mica and has a particle size varying from 50 to 4000 mesh. With respect to the reinforcing and extending fillers these are only added to the two component silicone sealant disclosed above solely for the purpose for giving the uncured silicone composition sag control. In addition to these ingredients, there may be added triorganosiloxy and a silanol terminated polysiloxane polymer of low viscosities so as to increase the plasticity of the composition. There may also be added as an optional ingredient a low viscosity silanol terminated diorganopolysiloxane polymer to slow down the rate of cure of the composition once the two components were mixed. The additive polymer not only increases the modulus of the final composition, speeds up the cure, but also facilitates the mixing of the one part to the other part. In addition to this composition the normal two part room temperature vulcanizable silicone rubber composition additives may be added such as adhesion promoters, etc. The basic aspect of the present invention lies in the utilization in the instant compositions of at least from 75 to 150 parts of the vapor barrier filler and more preferably 100 to 150 parts by weight of the vapor barrier filler of which most preferably comprises all mica filler and in a less preferable embodiment up to 30% by weight of said vapor barrier filler can be talc. As stated previously preferably all the vapor barrier filler comprises mica whether such mica is dry or wet base mica having a particle size in the range of 50 to 4000 mesh. It is also envisioned and in accordance with the present invention there can be provided a two part room temperature vulcanizable or elevated temperature vulcanizable two component silicone composition composed of the foregoing mica filler in the above indicated amounts which is per hundred parts of a vinyl terminated diorganopolysiloxane polymer having as the cross-linking agent hydride silane or polysiloxane with a platinum catalyst as is well known in such two component room temperature vulcanizable silicone rubber composition.

DESCRIPTION OF THE PREFERRED EMBODIMENT

In one type of room temperature vulcanizable silicone rubber compositions utilized in the instant invention there is present 100 paprts by weight of a linear diorganopolysiloxane polymer which is silanol end-stopped having a viscosity varying from 100 to 500,000 centipoise at 25° C. The organo groups may generally be selected from the class consisting of monovalent hydrocarbon radicals and halogenated monovalent hydrocarbon radicals. Such organo groups can be selected from alkyl radicals such as methyl, ethyl, propyl, cycloalkyl radicals such as cyclohexyl, cycloethyl, etc. mono-nuclear aryl radicals such as phenyl, methylphenyl, ethylphenyl, etc. alkenyl radicals such as vinyl, allyl, etc. and halogenated monovalent hydrocarbon radicals such as fluoroalkyl radicals such as trifluoropropyl, etc. Preferably the organo groups are selected from alkyl radicals, alkenyl radicals, phenyl radicals and fluoroalkyl radicals of 1 to 8 carbon atoms.

The preferred composition of polymers come within the scope of said linear silanol end-stopped diorganopolysiloxane are the ones that have the formula

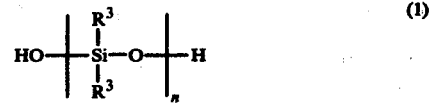

wherein $R^3$ has the same definition as the foregoing organo radicals and is most preferably selected from the alkyl radicals, alkenyl radicals, phenyl radicals, and fluoroalkyl radicals of 1 to 8 carbon atoms, and wherein n varies from 150 to 1500.

Linear silanol end-stopped diorganopolysiloxanes are well known in the art and they may be prepared for instance by polymerizing cyclictetrasiloxanes with the desired substituent groups in the presence of a toluene sulfonic acid catalyst or another mild acid catalyst. They can be prepared for instance by equilibrating cyclictetrasiloxanes of the desired substituting groups in the presence of an alkali metal catalyst with the appropriate chain stoppers to obtain high molecular weight linear diorganopolysiloxanes that is polysiloxanes having a viscosity of 500,000 centipoise to 200,000,000 centipoise at 25° C. The chain stoppers in such equilibration procedure are normally selected from triorganosiloxy end-stopped low molecular weight with the organo groups the same as defined above. The triorganosiloxy chain stopped linear diorganopolysiloxane polymer of high molecular weight can then be taken and there is added to it water and/or steam and the resulting high molecular linear diorganopolysiloxane polymer is then broken down to a low molecular weight linear diorganopolysiloxane polymer having silanol terminal units and having a viscosity within the required 100 to 500,000 centipoise at 25° C range.

A more preferred procedure for obtaining such linear silanol end-stopped diorganopolysiloxane polymers such as those in formula 1 above, is to take the hydrolyzate equilibrated cyclictetrasiloxanes containing the preferred substitute groups with a low molecular weight silanol end-stopped diorganopolysiloxane polymer to obtain the silanol terminated diorganopolysiloxane polymer of the preferred or desired viscosity within the range given above. The low molecular weight silanol-terminated diorganopolysiloxane polymer is obtained by simply hydrolyzing diorganodichlorosilanes and refluxing the resulting hydrolyzate to separate the low molecular weight silanol end-stopped diorganopolysiloxane polymers that are formed in such a hydrolyzate. To 100 parts of this polymer there is generally added 75 to 150 parts by weight of a vapor barrier filler which is mica with optionally up to 30% by weight of said vapor barrier filler being talc.

Mica must be present as a ingredient in the instant compositions of the present case in the above stated concentration. Further, such silanol end-stopped polymers as disclosed in the instant invention are those for instance set forth in Bessemer/Lampe U.S. Pat. No. 3,888,815 which disclosure is hereby incorporated in the present application by reference. This is true also for many of the other ingredients disclosed in the instant composition. As stated previously, the necessary ingredient for a filler in the instant compositions is a mica filler, which can either be a wet ground mica or a dry ground mica. As stated previously generally from 75 to 150 parts by weight of mica must be used per one hundred parts of the linear diorganopolysiloxane polymer. More preferably, from 100 to 150 parts of the mica filler is utilized per 100 parts by the weight of the base silanol end-stopped linear diorganopolysiloxane polymer. It has been found that the insertion of the mica filler in the foregoing quantities that provides resistance to moisture penetration of the compositions of the instant case.

It should be noted that while talc can be utilized to a certain extent to replace mica as filler such amount of talc must not exceed 30% by weight of the total amount of such vapor barrier filler and specifically the combination of talc and mica fillers. It should be noted that if less than 75 parts by weight of mica is utilized in the instant compositions, the desired resistance to moisture penetration is not achieved. When there is utilized more than 150 parts of mica or combination of mica and talc, the additional amount of over 150 parts although providing additional resistance to the composition to moisture penetration the additional resistance is not a marked improvement of the case where 150 parts of mica or mica-talc fillers are utilized in the instant composition.

Along with the mica and talc fillers there may be utilized from 0 to 30 parts and preferably from 5 to 20 parts by weight per 100 parts by weight of the linear silanol end-stopped diorganopolysiloxane of a reinforcing or extending filler. It should be noted that preferably 5 to 20 parts by weight of additional filler such as the traditional reinforcing or extending fillers be utilized in the compositions of the instant case. The reinforcing fillers are well known in the art and constitute principally precipitated silica and fumed silica having a particle size varying anywhere from 50 to 400 mesh in size. The reinforcing or extending fillers may be utilized in place or in mixtures with the reinforcing fillers such extending fillers may be selected from a large class of extending fillers such as those consisting of titanium dioxide, lithapone, zinc oxides, zirconium silicate, silica aero-gel, iron oxide, diatomaceous earth, calcium carbonate, glass fibers, magnesium oxide, chromic oxide, zirconium oxide, aluminum oxide, quartz, clay, asbestos, carbon, graphite, quartz carbon and synthetic fibers. In the most preferred application of the instant case some additional filler is utilized in addition to the mica and talc fillers. It is preferred that the additional filler be of the reinforcing type such as fumed silica or precipitated silica. Sufficient quantities of the reinforcing filler are utilized in the instant composition so as to impart to it sag control properties that is the composition upon being applied to a vertical surface will stay there without seeping or moving to a great extent prior to cure.

The mica or talc can be treated or untreated. Usually mica or talc can be treated with cyclicpolysiloxanes or fatty acids such as oleic acid. The reinforcing filler or extending fillers may also be treated with cyclicpolysiloxanes. The advantage of treating the fillers is that the treated fillers do not unduly increase the viscosity of the composition at the same concentrations. It should also be noted that treated fillers are also desirable in that they result in better sag control.

It should be noted additionally in the instant disclosure that with respect to the mica based filler there must be utilized in the instant case mica-based filler having a size varying anywhere from 50 to 4000 mesh and may be dry based or wet based. These fillers alone with the slianol end-stopped linear diorganopolysiloxane polymer constitute the basic first component of the instant case that is the one component of the two component composition.

In the second component comprises generally from 1 to 15 parts by weight based on a hundred parts of the silanol end-stopped linear diorganopolysiloxane of a cross-linking agent selected from the class consisting of
(2) $R_a Si (OR^1)_{4-a}$ and partial hydrolysis products thereof where R and $R^1$ are selected from the class consisting of monovalent hydrocarbon radicals and halogenated monovalent hydrocarbon radicals and a is 0 or 1. Generally, the organo substituting groups as disclosed above for R and $R^1$ are same as the organo groups of the silanol end-stopped linear diorganopolysiloxane polymer. In Formula 1 above a can be either 0 or 1. Either type of alkoxylated silane would provide the proper crosslinking in the instant composition.

It should also be noted as stated above that partial hydrolysis products of such silicates may also be utilized as cross-linking agents in the two component room temperature vulcanizable silicone rubber composition of the instant case. Such silicates and partial hydrolysis products of such silicates are well known in the art, as for instance set forth in the foregoing Bessemer/Lampe Patent. Such silicates may be utilized by themselves as crosslinking agents or their may be utilized in place of them as a cross linking agent a resinous copolymer composed of $R_3^2 SiO_{0.5}$ units and $SiO_2$ units in a weight ratio of 0.5:1 to 1:1 where $R^2$ is selected from monovalent hydrocarbon radicals and halogenated monovalent hydrocarbon radicals and mixtures thereof. The $R^2$ radical may generally represent the same groups as those given above for the $R^3$ radicals, as well as the R' groups for the silicates. Most preferably as stated previously the $R,R',R^3,R^2$ substituting group are selected from alkyl radicals, phenyl radicals, alkenyl radicals, fluoroalkyl radicals such as trifluoropropyl and mixtures thereof. Such substituting groups preferably do not have more than 8 carbon atoms. Such resinous copolymers as cross-linking agents for two component room temperature vulcanizable silicone rubber compositions is set forth in the Modic U.S. Pat. No. 3,457,214 which is incorporated by reference in the instant case.

It should be also noted that generally it is not necessary that either the silicates for Formula 1 or the resinous copolymer as discussed above that either one or the other be utilized as a cross linking agent in the composition of the instant case, since it is suitable in some cases to utilize as a cross-linking agent a mixture of the silicate of the partial hydrolysis products that are with the resinous copolymer.

Such cross-linking agents are utilized at a concentration of 1 to 15 parts by weight based on the undred parts of the silanol end-stopped linear diorganopolysiloxane polymer. More preferably there is utilized 1 to 10 parts by weight of such cross-linking agents either one alone or mixtures thereof.

Further, there must be present in the composition from 0.01 to 5 parts by weight based on a hundred parts of the silanol end-stopped linear diorganopolysiloxane polmyer of a catalyst selected from metal salts of a carboxylic acid or dicarboxylic acids where the metal varies from lead to maganese in the Periodic Table. Preferred catalysts are dibutyl tin oxide and dibutyl tin dilaurate for utilization in the instant invention. The catalyst is mixed with the cross-linking agent and kept separate from the base polymer which usually contains the filler ingredients in it.

When it is desired to cure the composition the two components are mixed immediately prior to usage and then applied or molded to form the desired sealant bead and the mixed silicone composition is then cured to a silicone elastomer over a period of time varying from $\frac{1}{2}$ hour to 12 hours. However, in accordance with the high speed of cure of such systems that can be formulated the work life of silicone compositions is within 10 minutes after being mixed and applied to provide the proper sealant function.

Other ingredients for such low vapor transmission rate room temperature vulcanizable silicone rubber compositions can be utilized in the instant compositions for instance the nitrogen functional silanes of the foregoing Lampe/Bessemer Patent can be utilized in the instant compositions to provide a self-bonding two component room temperature vulcanizable silicone rubber composition which composition will bond in a superior manner to adhere to most substrates as to metal substrates, concrete, glass, and various plastics.

In addition to the other two ingredients mentioned above in the present two component room temperature vulcanizable silicone rubber composition there may be utilized from 5 to 35 parts by weight based on a hundred parts of silanol end-stopped linear diorganopolysiloxane polymer, and organopolysiloxane polymer having triorganosiloxy terminal units and silanol terminal units where the ratio of triorganosiloxy terminal units to silanol terminal units varies from 1 to 1, 1 to 10 and which polymer has a viscosity varying from 50 to 1000 centipoise at 25° C and where such organo groups are preferably selected from the class of alkyl radicals, vinyl radicals, phenyl radicals and fluoroalkyl radicals. This ingredient which is preferably mixed with silanol end-stopped based polymer slows down the cure and increases the modulus of the silicone elastomer or sealant that is formed from the composition. It should be noted that this polymer species has in it also has some trifunctional polymer species in the polymer mixture. This ingredient does not have to be utilized with the instant composition. However, it is advantageously utilized to produce a cured silicone sealant for insulated window panes with lower modulus and the improved tear strength. Such polymers are well known in the silicone art and are simply prepared by hydrolyzing with water a mixture of diorganodichlorosilanes and monoorganotrichlorosilanes as is well known in the art.

Another optional and additional ingredient which facilitates the deep section of the two component room temperature vulcanizable silicone rubber composition in the instant case is a low molecular weight silanol terminated diorganopolysiloxane polymer. Such low molecular weight silanol terminated diorganopolysiloxane polymer may be utilized at a concentration of 2 to 10 parts by weight of the base polymer and has a viscosity varying anywhere from 100 to 500 centipoise at 25° C where the organo groups of such low molecular weight diorganopolysiloxane polymer are again preferably selected from the class consisting of alkyl radicals, alkenyl radicals, phenyl radicals and fluoroalkyl radicals of from 1 to 8 carbon atoms. Such low molecular weight silanol terminated diorganopolysiloxane polymers are preferably formed from again the hydrolysis of diorganodichlorosilanes. The use of such polymers in room temperature vulcanizable silicone rubber compositions is well known as can be seen in the U.S. Pat. No. of Dale Beers 3,845,161 which is incorporated into the present specification by reference.

Such low molecular weight silanol terminated diorganopolysiloxane polymer is preferably mixed in the base polymer. If it was mixed with the cross-linking ingredient it would be polymerized and not function effectively as a deep section curing agent in the instant composition.

Another optional ingredient that may be utilized in the instant composition is for instance from 2 to 10 parts by weight of a triorganosiloxy terminated linear diorganopolysiloxane polymer having a viscosity varying from 5 to 500 centipoise at 25° C wherein the said organo groups are again selected from the groups consisting of alkyl radicals, alkenyl radicals, phenyl radicals and fluoroalkyl radicals of 1 to 8 carbon atoms. Such linear diorganopolysiloxane polymer having a low molecular weight is simply utilized as a plastizing agent in the instant composition. It is preferably mixed with the catalyst and the cross-linking agent to facilitate the mixing of the catalyst in the base composition so that the composition will have a uniform cure rate throughout the composition.

The composition is applied after the two components are mixed and applied to form the sealant function for forming insulated glass panes or performing any other sealant or encapsulating function.

Triorganosiloxy terminated diorganopolysiloxane polymers of low molecular weight and a viscosity in the range specified above as well the low molecular weight silanol terminated diorganopolysiloxane polymers are well known in the art, as well as to silicone producers and can simply be produced in one case by the hydrolysis of diorganodichlorosilanes and the other case by the equilibration of cyclictetrasiloxanes with a large amount of change stopper composed of triorganosiloxy terminal units such as hexamethyldisiloxane, etc. The self-bonding additives disclosed in the foregoing Lampe/Bessemer Patents can be utilized at a concentration of 0.01 to 10 parts by weight based on 100 parts of the silanol end-stopped linear diorganopolysiloxane base polymer said self-bonding additives being nitrogen functional silanes or siloxanes identified in the foregoing Bessemer/Lampe Patent which is herein incorporated in the present case by reference. The preferred self-bonding additive for use in the instant composition is gamma aminopropyltriethoxy silane and the mixtures of the various gamma aminopropyltriethoxy silane. It is also necessary to go into the preparation of such self-bonding additives since these self-bonding additives are fully disclosed and discussed in the foregoing Bessemer/Lampe Patent. As far as the self-bonding additive is concerned its preferably mixed in the base composition or it can be mixed with the cross-linking agent and the catalyst. In addition, other ingredients may be utilized in the instant composition as is felt necessary to achieve the desired properties in the final composition for a specific utility. However, generally, the disclosure of the instant case discloses two component room temperature vulcanizable silicone rubber compositions which have in them as a basic filler a mica filler of which up to 30% by weight can be optionally substituted by talc and results in a cured silicone elastomer with desirable resistance to water vapor transmission. Although as stated previously, talc can be substituted for some extent for the mica it has been found that when mica is the sole filler there results the best barrier to moisture transmission in silicone compositions. Other fillers disclosed previously as reinforcing silica fillers are utilized solely for imparting to the composition consistency prior to cure and making it sag resistant. However, such reinforcing fillers perform no function in resisting the passage of moisture through the composition. It should be noted that it has been found that two part room temperature vulcanizable silicone rubber composition having in them the normal reinforcing and extending fillers disclosed above and no mica, have a moisture vapor transmission rate of 40 to 50 grams per meter square for test samples 69 to 70 mils thick.

The instant invention that is the use of the mica filler completely or optionally with some talc is also suitable for making SiH olefin platinum catalyst compositions resistant to moisture vapor transmission. There is envisioned by the present invention a low vapor transmission rate silicone composition comprising 100 parts by weight of a vinyl containing polysiloxane polymer of the formula

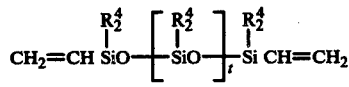

where $R^4$ is selected from the class consisting of monovalent hydrocarbon radicals and halogenated monovalent hydrocarbon radicals and t varies such that the polymer has a viscosity varying from 1,000 to 500,000 centipoise viscosity at 25° C. Again with this base polymer may be utilized from 75 to 150 parts by weight of a vapor barrier filler selected from class consisting of mica where optionally up to 30% by weight of said vapor barrier filler can comprise talc. There can also be present 0 to 30 parts by weight of a reinforcing or extending filler and at least 0.1 parts per million of a platinum catalyst and from 1 to 50 parts by weight per hundred parts of the vinyl terminated base polymer of a hydride cross-linking agent selected from the class consisting of hydrogen containing silanes and hydrogen containing siloxanes. The novel ingredient in these compositions is the use of the mica filler. Such compositions without the mica and optionally the talc filler as for instance those disclosed in Jeram/Striker U.S. Pat. No. 3,884,866 which is hereby incorporated in the present case by reference. The vinyl terminated polysiloxanes and the blends of such vinyl containing polysiloxanes as well as the hydride cross-linking agent their method of preparation are fully disclosed In the foregoing Jeram/Striker Patent which is incorporated in the present case by reference. It should be noted that there is envisioned in the present case that there need not be a blend of a high viscosity and a low viscosity vinyl terminated polysiloxanes for use within the scope of the present invention. There only need be only one vinyl terminated diorganopolysiloxane polymer in the SiH olefin platinum catalyzed compositions of the instant case. A blend of polymers as disclosed in the foregoing Jeram/Striker Patent may be utilized for certain applications. The normal reinforcing and extending fillers are optionally used in the composition for sag control purposes again. The cross-linking gents that may be utilized in the compositions of the instant case whether it be a hydrogen containing silanes, siloxanes or siloxane resins is optional as set forth in the foregoing Jeram/Striker Patent. As far as the platinum catalysts are concerned many types of platinum compounds for this SiH olefin addition reactions are known and such platinum catalysts may be used for the reaction of the present case. The preferred platinum catalysts are those platinum compounds catalysts which are soluble in the present reaction mixture. The platinum compound can be selected from those having the formula (Pt $Cl_2$Olefin)$_2$ and H(PtCl$_3$Olefin) as described in U.S. Pat. No. 3,159,601, Ashby. The olefin shown in the previous two formulas can be almost any type of olefin, but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc. A further platinum containing material usable in the composition of the present invention is the platinum chloride cyclopropane complex (PtCl$_2$C$_3$H$_6$)$_2$ described in U.S. Pat. No. 3,159,662, Ashby. Still, further, the patent containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

It should be noted that it is not necessary for the reinforcing and extending fillers which are optionally utilized in the instant inventions to be treated with cyclicpolysiloxanes. If treated they will perform a little better in the instant composition in that they will not increase the viscosity of the composition unduly while imparting to the composition sag control. The instant invention lies in the use of mica fillers as basic fillers in SiH olefin platinum catalyzed compositions, with optionally the addition of reinforcing and extending fillers to some extent. Such SiH olefin platinum catalyzed compositions can be any type of siH olefin platinum catalyzed compositions other than the ones discussed above. It is only necessary in the instant composition that there be present the vinyl terminated diorganopolysiloxane base polymer, the platinum catalyst, the mica filler and optionally talc or extending or reinforcing fillers and finally the hydride cross linking agent. Usually the platinum is inserted into the base vinyl containing base polymer which is mixed with the mica and the other fillers. The platinum is normally mixed with the hydride cross-linking agent although it can be mixed with the vinyl containing base polymer. The two components are then kept separate. When it is desired to cure the composition, the two components are mixed and the composition cures over an extended period of time at room temperatures, say a period of time of 1 hour to 24 hours at room temperature or at in a period of seconds at elevated temperatures of 150° C, making such a composition highly suitable for an encapsulant. In the examples below there was used the ASTM E-96, -E-66, moisture vapor test under condition E. This ASTM Test is carried out in an outer dish which is filled to a marked degree with potassium salts and water into which there is placed a Petri dish with the sample of a uniform thickness over the Petri dish and with a dessicant inside the Petri dish such that there is 0% humidity in the atmosphere of the Petri Dish which is covered by the silicone sample or other sample. There is then placed a cover over the outer dish such that the potassium salts and water at the bottom of the outer dish maintain an atmosphere at 90% relative humidity. The resulting enclosed outer dish containing the Petri dish and sample in it is then placed in an oven maintained at 100° F and a run is made for two weeks. The moisture pick up in the silicone sample or other sample is measured every 24 hours. The average reading for a 24 hour period during the second week of readings is then taken as the value for the moisture pick up of the sample. The foregoing examples are given for the purpose of illustrating the conception and reduction to practice of the instant invention. They are not given for any purpose to limit the description or disclosure of the instant case. All parts in these examples are by weight.

EXAMPLE 1

There was prepared a base composition comprising 800 parts by weight of a silanol terminated dimethylpolysiloxane polymer having 3000 centipoise at 25° C, 200 parts by weight of a trimethylsiloxy silanol endstopped methylpolysiloxane polymer of 600 centipoise viscosity at 25° C 100 parts by weight of octamethylcyclictetrasiloxane treated funed silica and 810 parts by weight of water ground mica 325 mesh to 100 parts of the foregoing base composition which is hereafter referred to as component A there was mixed 10 parts of component B which was formed by mixing 33 parts by weight of a trimethylsiloxy end-stopped dimethylpolysiloxane polymer of 10 centipoise viscosity at 25° C 4.0 parts by weight of gamma aminopropyltriethoxy silane 2.04 parts of partially hydrolyzed ethyl silicate and 0.68 parts of dibutyl tin oxide. The resulting composition had the following properties:
Tensile strength psi: 400
Elongation %: 50
Shore A Hardness: 60

The resulting composition also in the Lap Sheer Test with Tinius Olsen Apparatus had an extension rate of 0.5 inches per minute. Its adhesion on stainless steel screen on Alclad aluminum of 70 pounds per inch with 5% cohesive failure. Its adhesion on Alclad aluminum plus glass screen with 1/4 inch bond line was 52 lbs. per inch and 35% cohesive failure.

Further Component A was catalyzed with 10 parts per 100 parts of component A of a catalyst system prepared by mixing 22.5 parts of a gamma aminopropyltriethoxy silane 11:26 parts of partially hydrolyzed ethyl silicate 3.75 parts of tin oxide which was solubilized with a phthylate and 62.48 parts of mineral spirits when such a composition was prepared the adhesion was measured on an aluminum screen on Alclad aluminum which gave a value in one test of 105 pounds per inch with 50% of cohesive failure and a value of 83 pounds per inch with 50% cohesive in the second test. In another test with an Alclad aluminum with a stainless steel screen test the composition gave a result of 80 pounds per inch plus 60% cohesive failure. When the ASTM E-96-66 Test condition E was applied to a sample of this material 69 mils thick the sample had a moisture vapor transmission rate of 8.63 grams per square meter.

EXAMPLE II

There was mixed with 480 parts of silanol endstopped dimethylpolysiloxane of 4200 centipoise viscosity at 25° C, 120 parts of trimethylsiloxy end-stopped, silanol end-stopped polysiloxane oil, and 18 parts of a cyclicsiloxane treated fumed silica and 480 parts of 160 mesh mica which was treated with 4% by weight of stearic acid. To 100 parts of the above composition there was added 10 parts of a catalyst composition prepared by mixing 102 parts of a vinyl terminated dimethylpolysiloxane of 3,000 cps at 25° C, 120 parts of Ca $CO_3$, 48 parts of gamma aminopropyltriethoxysilane, 24 parts of partially hydrolyzed ethyl silicate and 3.6 parts of dibutyl tin dilaurate.

Sample sheets of the composition which had cured for 24 hours at 25° C gave the following physicals and moisture vapor transmission rate (MVTR):
Tensile Strength psi: 330
Elongation %: 70
Shore A Hardness: 62
MVTR - 8.25 grams/$M^2$ on sheet 74 mils thick.

EXAMPLE III

There was mixed into 800 parts of silanol end-stopped dimethylpolysiloxane having a viscosity 600 centipoise at 25° C, 200 parts of a trimethylsiloxy, end-stopped, silanol end-stopped methylpolysiloxane oil, 30 parts of cyclicsiloxane treated fumed silica and 800 parts of 160 mesh mica. To 100 parts of the above composition there was added 10 parts by weight of the catalyst composition of Example III. The resulting sample sheets which were cured for 24 hours at 25° C had the following properties and moisture vapor transmission rate:
Tensile psi: 310
Elongation %: 60
Shore A Hardness: 60
MVTR = 9.32 grams/$M^2$ on a sheet 76 mils thick.

I claim:
1. A low vapor transmission rate room temperature vulcanizable silicone composition comprising (a) 100 parts by weight of a diorganopolysiloxane polymer having a viscosity varying from 100 to 500,000 centipoise at 25° C wherein said organo groups are selected from the class consisting of monovalent hydrocarbon radicals and halogenated monovalent hydrocarbon radicals; (b) from 75 to 150 parts by weight of a vapor barrier filler which is mica; (c) 0 to 30 parts by weight of a reinforcing or extending filler; (d) from 1 to 15 parts by weight of a cross-linking agent selected from the class consisting of $R_a Si(OR')_{4-a}$ and partial hydrolyzed products thereof where R and R' are selected from the class consisting of monovalent hydrocarbon radicals and halogenated monovalent hydrocarbon radicals, a is 0 or 1 and a resinous copolymer of $R_3{}^2SiO_{0.5}$ units and $SiO_2$ units in a weight ratio of 0.5:1 to 1:1 when $R^2$ is selected from monovalent hydrocarbon radicals and halogenated monovalent hydrocarbon radicals and mixtures thereof; and (e) from 0.01 to 5 parts by weight of metal salt of a carboxylic acid as a catalyst where the metal varies from lead to manganese in the Periodic Table.

2. The composition of claim 1 wherein the diorganopolysiloxane in the formula,

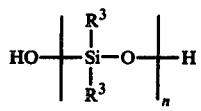

wherein $R^3$ is selected from the class consisting of alkyl radicals, alkenyl radicals, phenyl radicals and fluoroalkyl radicals of 1 to 8 carbon atoms, where n varies from 350 to 1500.

3. The composition of claim 1 wherein said vapor barrier filler is all mica filler.

4. The composition of claim 3 wherein said vapor barrier filler has a particle size of 50 to 4000 mesh.

5. The composition of claim 1 wherein there is present from 5 to 20 parts by weight of a reinforcing filler selected from ground silica and precipitated silica.

6. The composition of claim 1 wherein there is present from 5 to 35 parts by weight of an organopolysiloxane polymer having triorganosiloxane and silanol terminal units with as viscosity varying from 50 to 1000 centipoise at 25° C, wherein said organo groups are selected from the class consisting of alkyl radicals, vinyl radicals, phenyl radicals and fluoroalkyl radicals.

7. The composition of claim 1 wherein said composition has from 2 to 10 parts by weight of silanol terminated diorganopolysiloxane polymers having a viscosity varying from 100 to 500 centipoise at 25° C wherein said organo groups are selected from the class consisting of alkyl radicals, alkenyl radicals, phenyl radicals and fluoroalkyl radicals of 1 to 8 carbon atoms.

8. The compositions of claim 1 wherein said composition has from 2 to 10 parts by weight of triorganosiloxy terminated diorganopolysiloxane polymer having a viscosity varying from 5 to 500 centipoise at 25° C wherein said organo groups are selected from the group consisting of alkyl radicals, alkenyl radicals, phenyl radicals and fluoroalkyl radicals of 1 to 8 carbon atoms.

9. The composition of claim 1 wherein said composition contains from 0.01 to 10 parts by weight of a self-bonding additive which may be a nitrogen functional silane or siloxane.

10. A process for forming a low moisture vapor transmission rate room temperature vulcanizable silicone composition comprising (1) mixing (a) 100 parts by weight of a diorganopolysiloxane polymer having a viscosity varying from 100 to 500,000 centipoise at 25° C wherein said organo groups are selected from the class consisting of monovalent hydrocarbon radicals and halogenated monovalent hydrocarbon radicals; (b) from 75 to 150 parts by weight of a vapor barrier filler which is mica, (c) 0 to 30 parts by weight of a reinforcing or extending filler; (d) from 1 to 15 parts by weight of a cross-linking agent selected from the class consisting of $R_aSi(OR')_{4-a}$ and partial hydrolyzed products thereof where R and R' are selected from the class consisting of monovalent hydrocarbon radicals and halogenated monovalent hydrocarbon radicals, a is 0 or 1 and a resinous polymer of $R_3{}^2SiO_{0.5}$ units and $SiO_2$ units in a weight ratio of 0.5:1 to 1:1 where $R^2$ is selected from monovalent hydrocarbon radicals and halogenated monovalent hydrocarbon radicals; and from 0.01 to 5 parts by weight of a metal salt of carboxylic acid as a catalyst wherein the metal varies from lead to manganese in the Periodic Table, and (e) allowing the composition to cure at room temperature.

11. A low vapor transmission rate silicone composition comprising (a) 100 parts by weight of a vinyl containing polysiloxane polymer of the formula,

where $R^4$ is selected from the class consisting of monovalent hydrocarbon radicals and halogenated monovalent hydrocarbon radicals and t varies such that the polymer has a viscosity varying from 100 to 500,000 centipoise viscosity at 25° C; (b) from 75 to 150 parts by weight of a vapor barrier filler selected from mica; (c) from 0 to 30 parts by weight of reinforcing or extending filler; (d) an effective amount of a platinum catalyst; and (e) from 1 to 50 parts by weight of a hydride cross-linking agent selected from the class consisting of hydrogen containing silane and hydrogen containing siloxane.

12. A process for preparing a low transmission silane composition comprising (1) mixing (a) 100 parts by weight of a vinyl containing polysiloxane polymer of the formula,

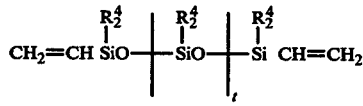

where $R^4$ is selected from the class consisting of monovalent hydrocarbon radicals and halogenated monovalent hydrocarbon radicals and t varies such that the polymer has a viscosity varying from 1,000 to 500,000 centipoise viscosity at 25° C; (b) from 75 to 150 parts by weight of a vapor barrier filler selected from mica; (c) from 0 to 30 parts by weight of a reinforcing or extending filler; (d) an effective amount of a platinum catalyst and (e) from 1 to 50 parts by weight of a hydride cross-linking agent selected from the class consisting of hydrogen containing silanes and hydrogen containing siloxanes.

* * * * *